United States Patent
Suciu et al.

(10) Patent No.: US 9,151,224 B2
(45) Date of Patent: *Oct. 6, 2015

(54) CONSTANT-SPEED PUMP SYSTEM FOR ENGINE THERMAL MANAGEMENT SYSTEM AOC REDUCTION AND ENVIRONMENTAL CONTROL SYSTEM LOSS ELIMINATION

(75) Inventors: Gabriel L. Suciu, Glastonbury, CT (US); Jorn A. Glahn, Manchester, CT (US); Brian D. Merry, Andover, CT (US); Christopher M. Dye, Glastonbury, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 831 days.

This patent is subject to a terminal disclaimer.

(21) Appl. No.: 13/419,695

(22) Filed: Mar. 14, 2012

(65) Prior Publication Data

US 2013/0239584 A1 Sep. 19, 2013

(51) Int. Cl.
| | |
|---|---|
| F02C 7/14 | (2006.01) |
| F02C 3/09 | (2006.01) |
| F02C 9/16 | (2006.01) |
| F02C 3/10 | (2006.01) |
| F02C 7/32 | (2006.01) |
| F02C 7/36 | (2006.01) |
| F02C 6/08 | (2006.01) |
| F01D 15/08 | (2006.01) |
| F02C 6/04 | (2006.01) |

(52) U.S. Cl.
CPC . *F02C 6/08* (2013.01); *F01D 15/08* (2013.01); *F02C 7/32* (2013.01); *Y02T 50/671* (2013.01)

(58) Field of Classification Search
CPC ............... F02C 7/14; F02C 3/09; F02C 3/10; F02C 9/16; F02C 6/04; F02C 6/08; F02C 7/32; F02C 7/36
USPC ............. 60/792, 226.1, 262, 39.08, 266
See application file for complete search history.

(56) References Cited

U.S. PATENT DOCUMENTS

| | | | | | |
|---|---|---|---|---|---|
| 2,620,123 | A | * | 12/1952 | Parducci | 417/369 |
| 2,775,208 | A | * | 12/1956 | Mueller | 415/168.2 |
| 3,147,712 | A | * | 9/1964 | Gaubatz | 137/565.33 |
| 3,557,557 | A | * | 1/1971 | Prachar | 60/257 |
| 3,680,309 | A | * | 8/1972 | Wallace, Jr. | 60/785 |
| 3,842,597 | A | * | 10/1974 | Ehrich | 60/226.1 |
| 4,120,152 | A | * | 10/1978 | Jackson, III | 60/221 |
| 4,627,237 | A | * | 12/1986 | Hutson | 60/487 |
| 4,640,153 | A | * | 2/1987 | Brogdon et al. | 475/31 |
| 4,645,415 | A | * | 2/1987 | Hovan et al. | 415/115 |
| 4,722,666 | A | * | 2/1988 | Dennison et al. | 416/94 |

(Continued)

OTHER PUBLICATIONS

International Preliminary Report on Patentability issued Sep. 16, 2014.

*Primary Examiner* — William H Rodriguez
*Assistant Examiner* — Eric Linderman
(74) *Attorney, Agent, or Firm* — Bachman & LaPointe, P.C.

(57) ABSTRACT

A gas turbine engine has a spool, a towershaft connected to the spool and an impeller pump. An integrated drive pump is connected to the towershaft and to the impeller pump for driving the impeller pump at a constant speed. The integrated drive pump is positioned on an engine core. The gas turbine engine includes a fan and a bypass duct located between a cowl and the engine core. The gas turbine engine includes an intake manifold for the impeller pump, and the intake manifold receives air from the bypass duct.

10 Claims, 4 Drawing Sheets

(56) References Cited

U.S. PATENT DOCUMENTS

| | | | |
|---|---|---|---|
| 4,934,140 A * | 6/1990 | Dennison et al. | 60/226.1 |
| 4,999,994 A * | 3/1991 | Ru/ d et al. | 60/39.08 |
| 5,123,242 A * | 6/1992 | Miller | 60/226.1 |
| 5,269,135 A * | 12/1993 | Vermejan et al. | 60/226.1 |
| 5,317,877 A | 6/1994 | Stuart | |
| 5,357,742 A * | 10/1994 | Miller | 60/785 |
| 5,447,026 A * | 9/1995 | Stanley | 60/372 |
| 5,845,483 A | 12/1998 | Petrowicz | |
| 5,987,877 A * | 11/1999 | Steiner | 60/39.08 |
| 6,035,627 A * | 3/2000 | Liu | 60/785 |
| 6,205,770 B1 * | 3/2001 | Williams et al. | 60/204 |
| 6,250,061 B1 | 6/2001 | Orlando | |
| 7,231,767 B2 | 6/2007 | Whiting | |
| 7,658,060 B2 | 2/2010 | Zysman et al. | |
| 7,665,310 B2 * | 2/2010 | Laborie | 60/806 |
| 7,886,520 B2 | 2/2011 | Stretton et al. | |
| 8,250,852 B2 * | 8/2012 | Porte et al. | 60/226.1 |
| 8,602,717 B2 * | 12/2013 | Suciu et al. | 415/1 |
| 2005/0120715 A1 * | 6/2005 | Labrador | 60/618 |
| 2006/0042227 A1 * | 3/2006 | Coffinberry | 60/226.1 |
| 2006/0042270 A1 * | 3/2006 | Thompson et al. | 60/802 |
| 2006/0117734 A1 * | 6/2006 | Larkin et al. | 60/226.1 |
| 2007/0144138 A1 * | 6/2007 | Dooley | 60/39.08 |
| 2007/0245738 A1 | 10/2007 | Stretton et al. | |
| 2007/0245739 A1 | 10/2007 | Stretton et al. | |
| 2008/0121376 A1 * | 5/2008 | Schwarz et al. | 165/104.28 |
| 2008/0141656 A1 * | 6/2008 | Beutin et al. | 60/262 |
| 2008/0202094 A1 * | 8/2008 | Brault et al. | 60/226.1 |
| 2008/0230651 A1 * | 9/2008 | Porte | 244/118.5 |
| 2009/0123274 A1 | 5/2009 | Chaudhry | |
| 2009/0139243 A1 * | 6/2009 | Winter | 60/802 |
| 2009/0188234 A1 * | 7/2009 | Suciu et al. | 60/262 |
| 2009/0205341 A1 * | 8/2009 | Muldoon | 60/792 |
| 2009/0324396 A1 | 12/2009 | Short et al. | |
| 2010/0024434 A1 * | 2/2010 | Moore et al. | 60/788 |
| 2010/0043386 A1 * | 2/2010 | Perveiler et al. | 60/39.5 |
| 2010/0107603 A1 * | 5/2010 | Smith | 60/267 |
| 2010/0180571 A1 * | 7/2010 | Zysman et al. | 60/204 |
| 2010/0229567 A1 | 9/2010 | Beardsley | |
| 2010/0236242 A1 * | 9/2010 | Farsad et al. | 60/685 |
| 2010/0242496 A1 * | 9/2010 | Cass et al. | 60/802 |
| 2010/0314877 A1 * | 12/2010 | Finney | 290/52 |
| 2011/0056208 A1 | 3/2011 | Norris et al. | |
| 2011/0131999 A1 * | 6/2011 | Gao et al. | 60/782 |
| 2011/0203293 A1 * | 8/2011 | Glahn | 60/785 |
| 2011/0289936 A1 * | 12/2011 | Suciu et al. | 60/802 |
| 2012/0159960 A1 * | 6/2012 | Brust et al. | 60/778 |
| 2012/0272658 A1 * | 11/2012 | Murphy | 60/783 |
| 2013/0047623 A1 * | 2/2013 | Suciu et al. | 60/772 |
| 2013/0047624 A1 * | 2/2013 | Suciu et al. | 60/772 |
| 2013/0086922 A1 * | 4/2013 | Suciu et al. | 60/802 |
| 2013/0097992 A1 * | 4/2013 | Suciu et al. | 60/39.83 |
| 2013/0098057 A1 * | 4/2013 | Suciu et al. | 60/779 |
| 2013/0098059 A1 * | 4/2013 | Suciu et al. | 60/783 |
| 2013/0098067 A1 * | 4/2013 | Suciu et al. | 60/802 |
| 2013/0239582 A1 * | 9/2013 | Suciu et al. | 60/785 |
| 2013/0239583 A1 * | 9/2013 | Suciu et al. | 60/785 |
| 2013/0239584 A1 * | 9/2013 | Suciu et al. | 60/792 |
| 2013/0239588 A1 * | 9/2013 | Suciu et al. | 60/806 |
| 2014/0096507 A1 * | 4/2014 | Mohammed | 60/226.1 |

* cited by examiner

CONSTANT-SPEED PUMP SYSTEM FOR ENGINE THERMAL MANAGEMENT SYSTEM AOC REDUCTION AND ENVIRONMENTAL CONTROL SYSTEM LOSS ELIMINATION

BACKGROUND

The present disclosure relates to the provision of further performance capability on a gas turbine engine by integrating a constant-speed device into a combined environmental control system and thermal management air system.

Gas turbine engines may use air-driven systems to manage engine temperature as part of a thermal management system (TMS) and to provide high pressure air for use in the passenger cabin via an environmental control system (ECS). TMS systems use heat exchangers to reject internal heat to the engine's surroundings. As fan pressure ratio drops as a result of engine designs, heat exchangers may become prohibitively large in size and weight and as a result require considerable valuable packaging volume.

ECS air is provided by bleed ports on the engine, for example, on the high pressure compressor. This use of bleed ports may result in performance loss. ECS air is routed through a series of pipes and valves, then through a pre-cooler near the top of the engine/aircraft interface to cool the air prior to entry into the aircraft wing, and then through the aircraft air cycle machine (ACM) for use in the cabin.

SUMMARY

In accordance with the present disclosure, there is provided a gas turbine engine which broadly comprises a spool, a towershaft connected to the spool, an impeller pump, and a speed control pump connected to the towershaft and to the impeller pump for driving the impeller pump at a constant speed.

Other details of the constant-speed pump system for engine thermal management systems, air-oil cooler reduction, and environmental control system loss elimination are set forth in the following detailed description and the accompanying drawings wherein like reference numerals depict like elements.

DETAILED DESCRIPTION

Figure 1:
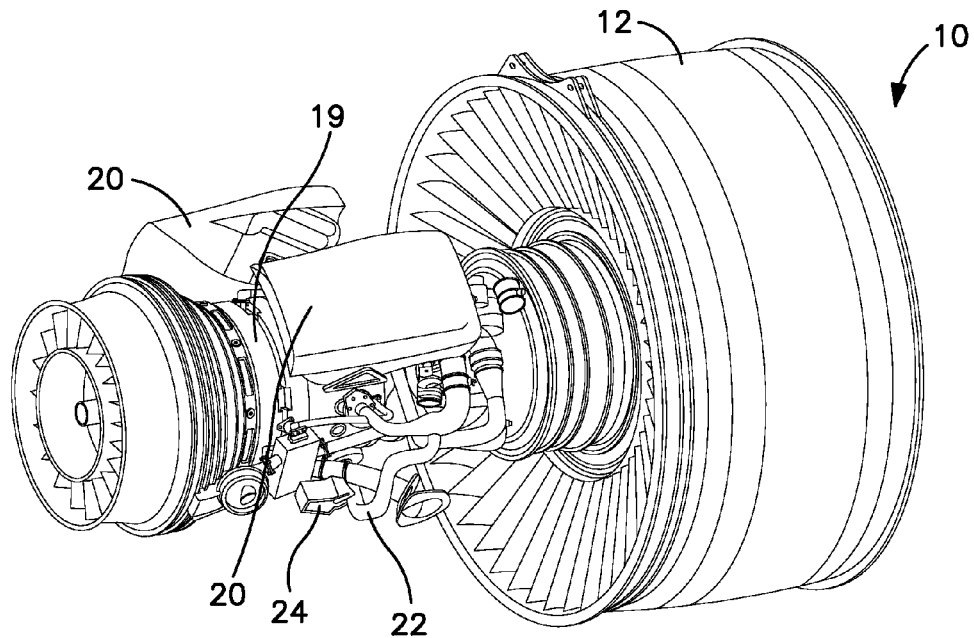
FIG. 1 is a perspective view of a portion of a gas turbine engine.
Figure 3:
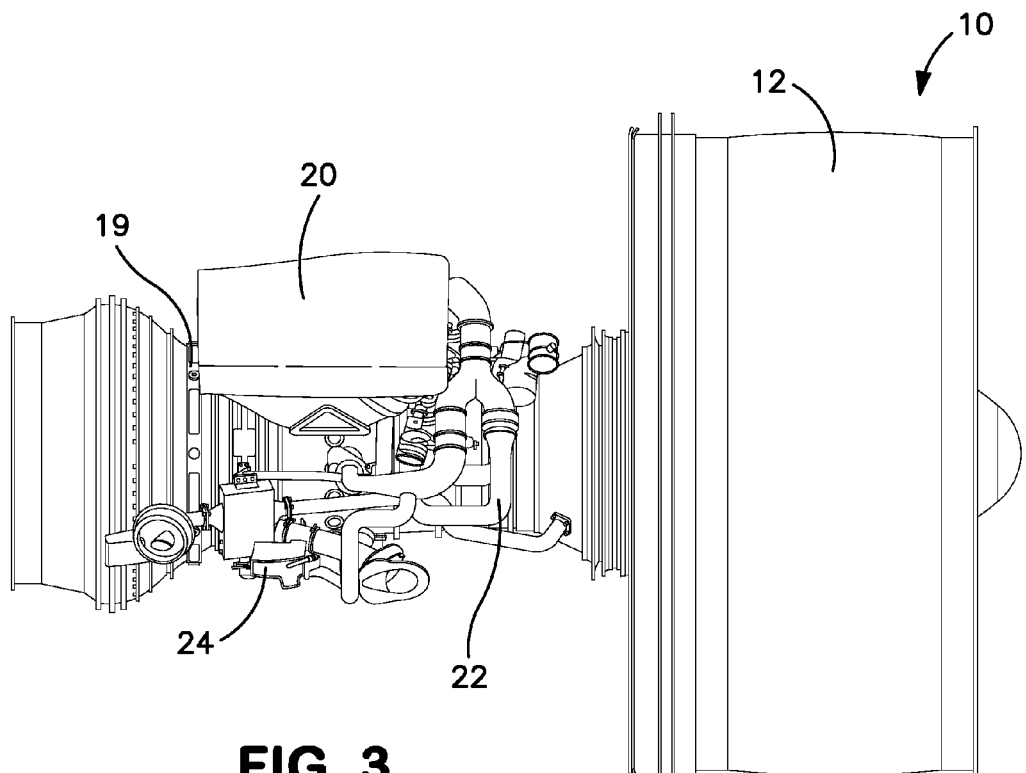
FIG. 3 is a side view of the engine of FIG. 1.
Figure 2:
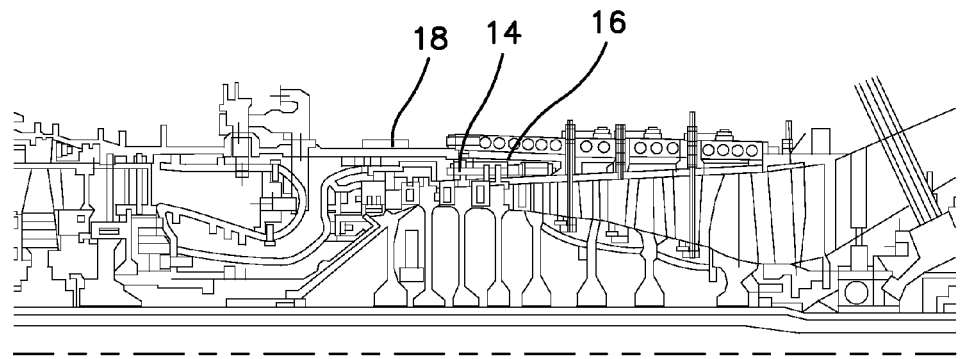
FIG. 2 is a sectional view of a gas turbine engine.

In accordance with the present disclosure, there is provided a single impeller-driven pump system and a constant speed device for providing air to separate environmental control systems and thermal management systems at improved efficiency.

As described herein, an impeller pump is used to raise pressure of flow from an engine fan stream for use as air system flow. ΔP for both an engine environmental control system and a thermal management system is provided by a single impeller, driven off a towershaft, such as a low spool towershaft. The use of a single impeller is enabled by use of an integrated drive pump (IDP), similar in function to that used in an aircraft integrated drive generator (IDG). The IDP converts variable speed input from the towershaft into constant-speed output power to drive the impeller pump. This allows for a better impeller sizing. Performance benefits are realized for utilizing the more operationally robust low spool for a power source. TMS heat exchangers are placed in the impeller intake manifold for increased cooling capacity and thus reduce heat exchanger size. Flow from the impeller pump discharge is sent via a single pipe up to the aircraft pre-cooler and ACM.

The system described herein may be incorporated with an engine accessory gearbox (AGB) using the existing towershaft as a means of drive power. The system may be incorporated into the AGB housing itself, towershaft housing, or layshaft housing for reduced packaging space if the engine configuration permits.

Referring now to FIGS. 1-4, there is shown a gas turbine engine 10 having a fan portion 12 and a high pressure compressor 14. As can be seen from FIG. 2, there is a forward bleed 16 for the environmental control system and an aft bleed 18 for the environmental control system. Air-oil coolers 20 are positioned adjacent to and externally of the engine core 19 containing the high pressure compressor 14. As can be seen from FIGS. 1 and 3, the environmental control system includes a number of pipes 22 and valves 24 which may include a system on-off valve, a high-pressure on-off valve, and a low pressure anti-backflow check valve.

The thermal management system includes the air-oil coolers 20 with fan stream inlet/exit ducts, a fuel oil cooler, and oil lines.

Figure 4:
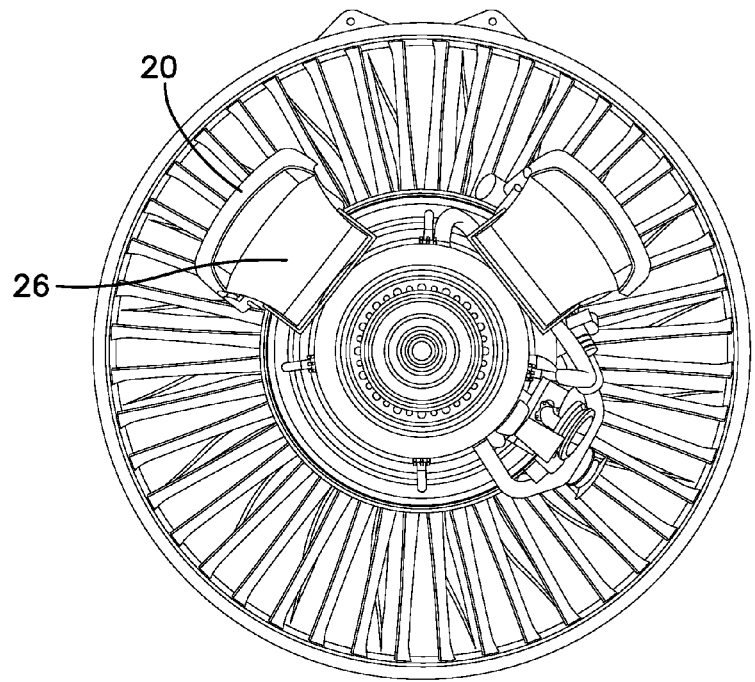
FIG. 4 is an aft view of the Engine of FIG. 1.

Referring now to FIG. 4, there is shown an aft view of a gas turbine engine and air-oil coolers 20 with the exit ducts 26.

Figure 5:
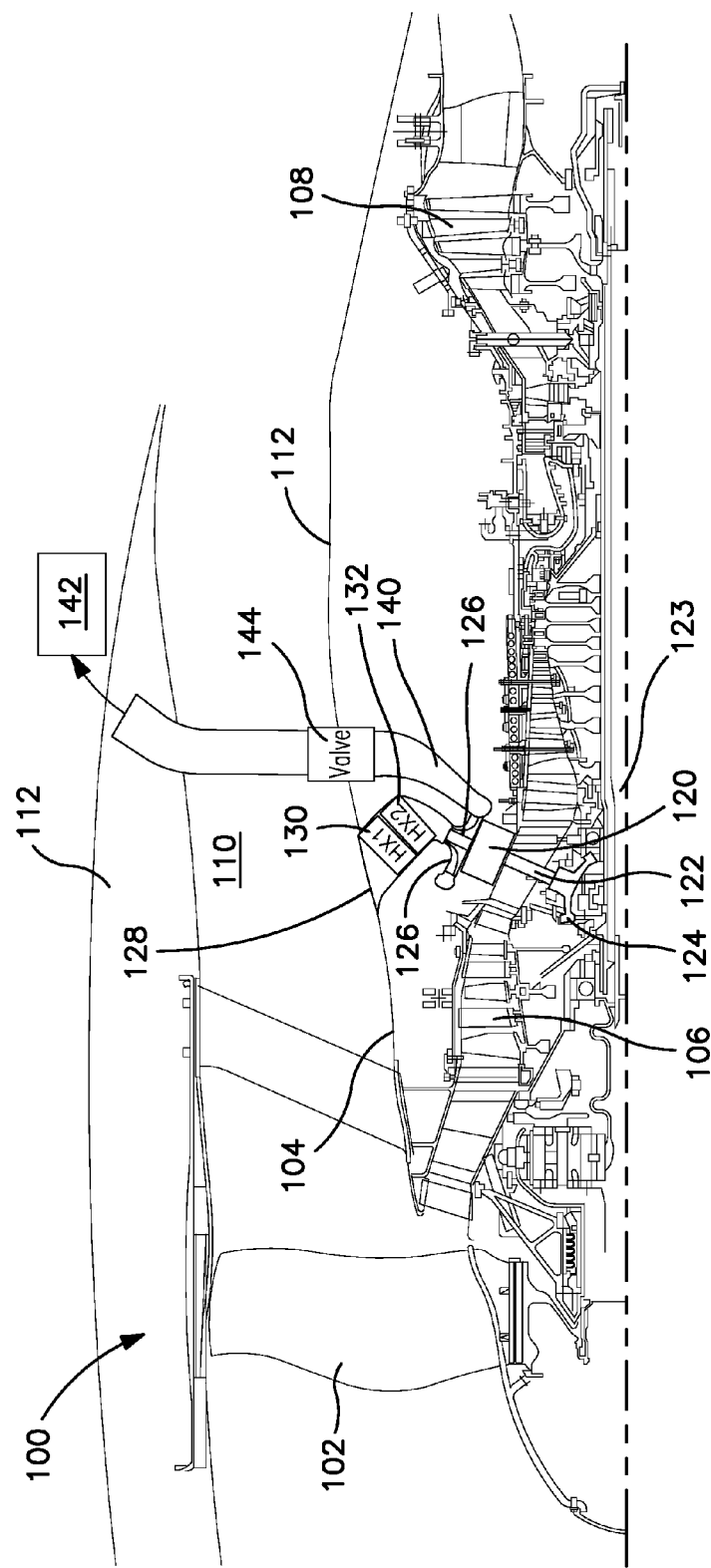
FIG. 5 is a sectional view of an engine having the constant-speed pump system of the present disclosure.

FIG. 5 illustrates the combined system of the present disclosure as installed on a gas turbine engine 100 having a fan 102, a core 104, with a compressor section 106 and a turbine section 108. As can be seen from the figure a bypass flow duct 110 is created by the cowl 112 and the core casing 114.

The system includes an integrated drive pump 120 for providing a constant speed drive. The pump 120 is connected to a towershaft 122 which is connected to the high spool or low spool shaft 123 of the engine via gear 124. An impeller pump 126 for the environmental control system and the thermal management system is attached to the integrated drive pump 120. The impeller pump 126 may be a centrifugal impeller for ΔP generation. The pump 120 drives the impeller pump 126 at a constant speed. The pump 120 may be an integrated drive pump (IDP), similar in function to that used in an aircraft integrated drive generator (IDG). The IDP converts variable speed input from the towershaft 122 into constant-speed output power to drive the impeller pump 126.

The system further includes an intake manifold 128 for the impeller pump 126. Mounted within the intake manifold 128 are the heat exchangers 130 and 132 which form the air-oil coolers for the thermal management system. While FIG. 5 shows two heat exchangers 130 and 132, one of the heat exchangers may be omitted if desired. Cool air from the bypass flow duct 110 is drawn into the intake manifold 128 by operation of the impeller pump 126 and the pump 120 and is used to cool the oil.

The environmental control system receives discharge air from the impeller pump 126 via the single pipe or duct 140. The discharge air flows through the pipe 140 to the aircraft precooler 142. A valve 144 may be incorporated into the pipe 140 to control the flow of discharge air through the duct 140.

Figure 6:
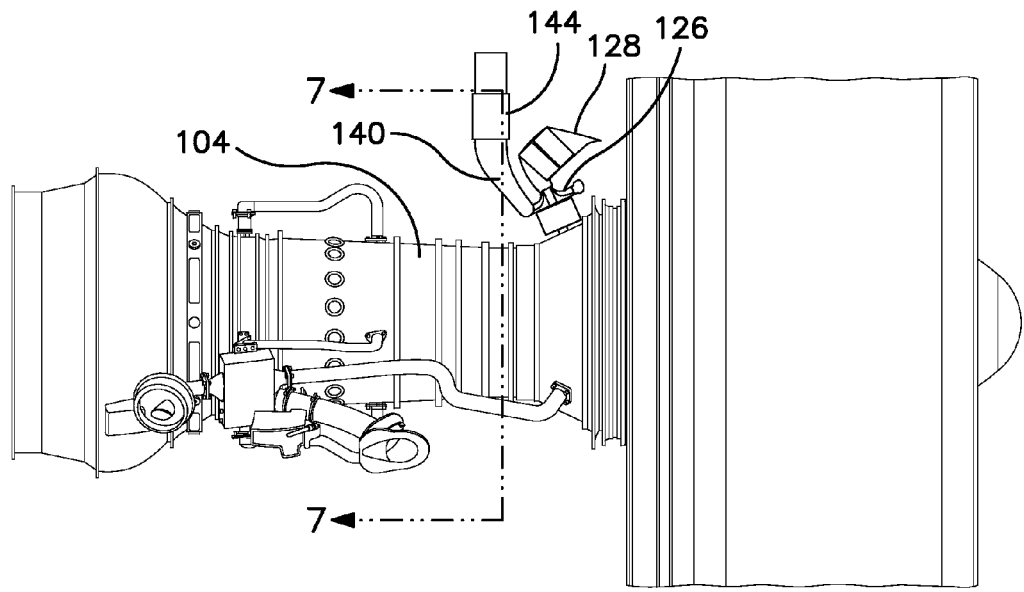
FIG. 6 is a side view of an engine having the constant-speed pump system of FIG. 5.
Figure 7:
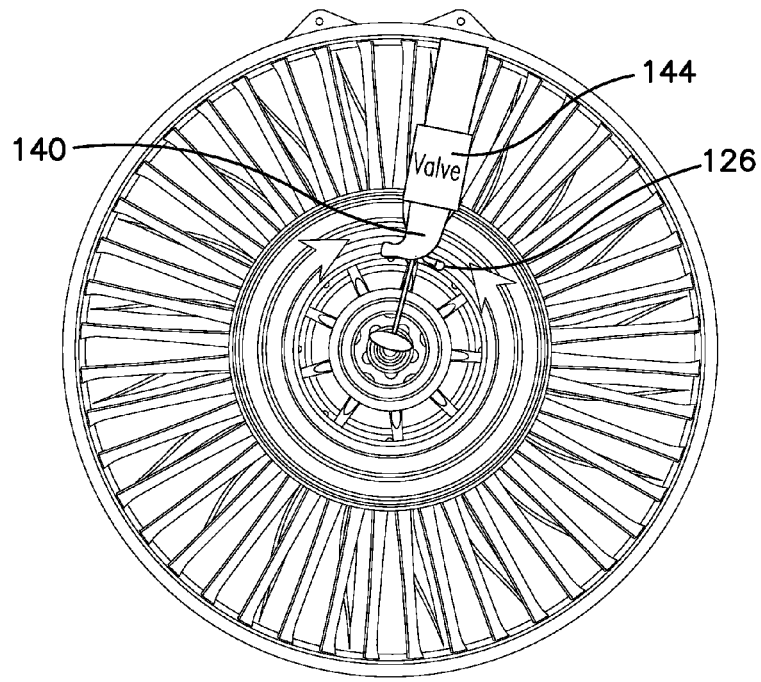
FIG. 7 is a sectional view taken along lines 6-6 in FIG. 6.

As shown in FIGS. 6 and 7, the system may be located at any convenient tangential location on the engine core 104. Further as shown in FIG. 6, use of the system of the present invention reduces the amount of pipes and valves that are present in other engines.

The system described herein provides general benefits to the engine itself and engine externals system. ECS mass flow is approximately 1 lb per second, and efficiency gains from not bleeding this air from the high pressure compressor are about 2% if power is instead extracted from the low spool, with reduced distortion due to lack of environmental control system bleeds. Exhaust gas temperature (EGT) at idle may also decrease by more than 200 degrees F. Overall ECS system weight will decrease due to the reduced size of ECS plumbing. Accordingly, valuable externals packaging space will be created with the reduction of ECS size. Further, mechanical complexity is reduced, increasing reliability, reducing cost, and reducing maintenance requirements.

There has been provided in accordance with the instant disclosure a constant-speed pump system for engine thermal management systems, air-oil cooler reduction, and environmental control system loss elimination. While the constant=speed pump system has been described in the context of specific embodiments thereof, other unforeseen alternatives, modifications, and variations may become apparent to those skilled in the art having read the foregoing disclosure. Accordingly, it is intended to embrace those alternatives, modifications and variations as fall within the broad scope of the appended claims.

What is claimed is:

1. A gas turbine engine comprising:
a spool;
a towershaft connected to the spool;
an impeller pump having a discharge and an outlet duct connected to said discharge, said outlet duct being connected to an aircraft pre-cooler used in an environmental control system;
an integrated drive pump connected to said towershaft and to said impeller pump for driving said impeller pump at a constant speed;
an engine core and said integrated drive pump being positioned on said engine core; and
a fan and a bypass duct between a cowl and said engine core, an intake manifold for said impeller pump, and said intake manifold receiving air from said bypass duct.

2. The gas turbine engine according to claim 1 further comprising at least one heat exchanger located within said intake manifold.

3. The gas turbine engine according to claim 2, further comprising two heat exchangers located within said intake manifold.

4. The gas turbine engine according to claim 2, wherein said at least one heat exchanger comprises at least one air-oil cooler for a thermal management system.

5. The gas turbine engine according to claim 1, further comprising a valve connected to said outlet duct for controlling flow through said outlet duct.

6. The gas turbine engine according to claim 1, wherein said spool comprises a low pressure spool for driving a low pressure compressor.

7. The gas turbine engine according to claim 1, wherein said spool comprises a high pressure spool for driving a high pressure compressor.

8. The gas turbine engine according to claim 1, wherein said impeller pump comprises a centrifugal impeller pump.

9. The gas turbine engine according to claim 1, wherein said towershaft is connected to said spool via a gear.

10. The gas turbine engine according to claim 1, wherein said fan produces thrust producing air flow.

* * * * *